United States Patent
Pham (10) Patent No.: US 10,695,873 B2
(45) Date of Patent: Jun. 30, 2020

(54) CONSTRUCTION OF A VEHICLE BODY STRUCTURE BY WELDING THIN SHEET METAL PANELS TO THICK METAL EXTRUSIONS

(71) Applicant: Tuan Anh Pham, Huntington Beach, CA (US)

(72) Inventor: Tuan Anh Pham, Huntignton Beach, CA (US)

( * ) Notice: Subject to any disclaimer, the term of this patent is extended or adjusted under 35 U.S.C. 154(b) by 199 days.

(21) Appl. No.: 15/786,354

(22) Filed: Oct. 17, 2017

(65) Prior Publication Data

US 2019/0111523 A1 Apr. 18, 2019

(51) Int. Cl.
*B23K 33/00* (2006.01)
*B23K 9/00* (2006.01)
*F16B 5/08* (2006.01)
*B64C 1/12* (2006.01)
*B23K 101/00* (2006.01)

(52) U.S. Cl.
CPC ............ *B23K 33/00* (2013.01); *B23K 9/0043* (2013.01); *B23K 2101/006* (2018.08); *B60Y 2410/124* (2013.01); *B64C 1/12* (2013.01); *F16B 5/08* (2013.01)

(58) Field of Classification Search
CPC .. Y10T 403/479; B23K 33/008; B23K 33/00; B23K 9/0043; B23K 2101/066; B64C 1/12
See application file for complete search history.

(56) References Cited

U.S. PATENT DOCUMENTS

| 3,465,420 | A | * | 9/1969 | Webb | C04B 28/26 228/199 |
| 4,041,270 | A | * | 8/1977 | Akahide | B23K 9/188 219/73 |
| 5,159,175 | A | * | 10/1992 | Loeber | B23K 9/02 219/137 R |
| 7,182,381 | B2 | * | 2/2007 | Ogawa | B62D 25/07 296/210 |
| 8,413,878 | B2 | * | 4/2013 | Hackius | B23K 9/235 228/249 |
| 9,586,628 | B2 | * | 3/2017 | Jensen | B62D 29/00 |
| 10,196,092 | B2 | * | 2/2019 | Seo | B62D 25/06 |
| 2017/0197269 | A1 | * | 7/2017 | Matsumoto | B23K 1/16 |
| 2019/0176902 | A1 | * | 6/2019 | Kagami | B60J 10/79 |

FOREIGN PATENT DOCUMENTS

| FR | 3020583 | B1 | * | 4/2016 | ............. B23K 9/091 |
| GB | 732645 | A | * | 6/1955 | ........... B61D 17/041 |

* cited by examiner

*Primary Examiner* — Joshua T Kennedy (57) ABSTRACT

The construction of vehicle body structure articles by welding sheet metal products to load bearing structural metal components. The sheet metal product is bent at the edges forming hemlines to dissipate heat uniformly in all directions from the welding location. The sheet metal product is welded at the bending knees of the hemlines edgewise to the longitudinal edges of the structural components while holding the outer surface of the metal sheet in alignment with the edges of the structural components.

6 Claims, 9 Drawing Sheets

CONSTRUCTION OF A VEHICLE BODY STRUCTURE BY WELDING THIN SHEET METAL PANELS TO THICK METAL EXTRUSIONS

BACKGROUND OF THE INVENTION

Field of the Invention

The present invention relates to construction of a vehicle body structure with a smooth surface suitable for automotive, aerospace, and recreational vehicle applications by welding thin sheet metal panels to substantially much thicker load bearing metal extrusions.

Discussion of Prior Art

Techniques for fabricating automotive vehicle structures commonly involves spot welding of preformed sheet metal panels onto hydroformed hollow metal tubes. Because of the differences in heat absorption capabilities between the thin sheet metal panels and the substantially thicker metal plate structures, it is very difficult or even not possible to weld the edge of a thin sheet metal panel directly onto the edge of a substantially thicker metal plate. During the welding process, the thin sheet metal panel and the thick metal plate suppose to melt at the welding location forming the joining molten metal puddle. Often, the thin sheet metal panel will melt first before the thick metal plate has begun to melt. Surface tension of the molten metal from the thin sheet metal panel tends to pool into a puddle on the sheet causing the thin sheet metal panel to form holes instead of a joining puddle between the sheet metal panel and the metal plate along the weld line, thus, not welding the sheet metal panel uniformly onto the metal plate as desired.

Because of this limitation, vehicle body structures are often spot welded as described in General Motors U.S. Pat. No. 6,373,021. Similarly, another resistance spot welding method which indirectly weld the sheet metal panel to tube is described by Ken Schmidt and Pei-Chung Wang U.S. Pat. No. 7,253,374 B2. Another approach was offered by Zdenek Prochazka U.S. Patent No. 2010/0044347 A1. Prochazka's patent discloses a method joining two sheet metal panels using butt welding method placed on top of a heat sink (i.e. Copper shoe) in a controlled environment. Prochazka's joining method may work for thicker metal plates where the molten puddle is substantially large. However, when joining two substantially thin sheet metal panels, the separation at the butt joint acts as insulation causing the molten metal surface tension to pull the molten puddle away from the weld join, thus, not being able to form a continuous weld line.

The difficulties in welding the edge of the thin sheet metal panel onto the edge of a much thicker metal plate is especially difficult for light weight non-ferrous metals such as Aluminum. Aluminum offers many advantages such as light weight, low cost, and ease of manufacturing yet it is exceedingly difficult to weld thin sheet Aluminum onto a substantially thicker Aluminum extrusion or plate. Therefore, what is desired is a method and system that can provide a method to weld the edge of a thin sheet metal panel uniformly along the edge of a substantially thicker metal plate forming a vehicle body structure suitable for aerospace, automotive and recreational vehicle applications which is light in weight and having a large smooth exterior surface.

SUMMARY OF THE INVENTION

In one aspect of the present invention, a sheet metal panel is welded substantially perpendicular to the longitudinal edge of a load bearing structure component such as a plate or a tube forming a vehicle body structure having a large exterior surface with a load bearing structure as an edge trim. Excess materials forming at the weld line above the sheet metal panel surface are removed to provide the vehicle body structure with a smooth exterior surface.

In another aspect of the present invention, two sheet metal panels are welded substantially perpendicular to the longitudinal edge of said load bearing structure component one on each side of the load bearing structure component forming a vehicle body structure having a large continuous exterior surface area on one side and on the other side having an interior surface with the load bearing structure component in the middle of the interior surface acting as both a load bearing member and a stiffener to the vehicle body structure. Excess materials formed at the weld lines above the exterior surface are removed to provide the vehicle body structure with a smooth exterior surface.

In another aspect of the invention, using the same said construction technique as described, a sandwich vehicle body structures is constructed by bonding the interior wall of said vehicle body structures with a core or a plurality of cores and an interior wall panel. The cores may be constructed of common insulation materials such as plastic foam, Fiberflass insulation, expanded polystyrofoam, etc. or the core may constructed using common composite honeycomb cores such as Nomex, Fiberglass, Polyimine, Graphite, Aluminum, etc. to provide desired insulation and stiffness properties with low weight increase. The interior body wall panels may be constructed from common suitable interior materials such as wood, plastic, fabric, leather, fiberglass, or metal, etc.

In another aspect of the present invention, using the same said construction technique as described, a double sided sandwich vehicle body structure is constructed by welding four sheet metal panels substantially perpendicular to the longitudinal edges of said load bearing structure component one on each side of the load bearing structure component forming a vehicle body structure having large continuous exterior surfaces on both sides of the structure and having two interior surfaces facing each other with the load bearing structure component in the middle of the interior surface acting as both a load bearing member and a stiffener to the vehicle body structure. Excess materials formed at the weld lines above the exterior surfaces are removed to provide the vehicle body structure with a smooth exterior surface on both side. The interior surfaces of the double sided vehicle structure are bonded together using a core or a plurality of cores.

In another aspect of the present invention, the cores of said vehicle body structures may be adhesively bonded or simply be inserted in between the interior side of the structure and the interior wall panel to provide desired stiffness and insulation properties.

In another aspect of the invention, a plurality of sheet metal panels can be welded between two or more load bearing structure members. Such sheet metal panels can be preformed so that the resulting vehicle structure surface can be a non-planar surface such as surface of a cone or a tube shape vehicle body suitable for aerospace vehicles.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following figures:

FIG. 6 is a cross-sectional view of the illustrating practice of an illustrative embodiment of the invention wherein a sheet metal panel is preformed with a U-shape channel having a substantially thick load bearing metal plate embedded in the U-shape channel flush with the surface. The exposed edges of the load bearing plate are welded longitudinally on each side of the thick plate to the bent knees of the U-shape channel forming a vehicle body structure comprising a continuous and smooth exterior surface having a load bearing metal plate component in the middle of the surface acting as both a load bearing member and a stiffener to the vehicle body structure. Furthermore, a sandwich structure is constructed by bonding or inserting a core or a plurality of cores in between the structure interior surface and an interior panel to provide the desired insulation and stiffness properties;

FIG. 8 is a cross-sectional view of the illustrating practice of an illustrative embodiment of the invention wherein the load bearing structure component having flanges and two sheet metal panels are welded onto the longitudinal edge without flanges of a load bearing structure component one on each side of the load bearing structure component forming a vehicle body structure having a continuous and smooth exterior surface and an interior surface with the load bearing structure component in the middle of the surface acting as both a load bearing member and a stiffener to the vehicle body structure. Furthermore, a vehicle sidewall structure is constructed by placing insulation materials behind the exterior surface area then mounting an interior wall panel to the flanges of the load bearing structure component to provide the desired insulation and decorative properties;

DETAILED DESCRIPTION OF THE PREFERRED EMBODIMENTS

The following detailed description is of the best currently contemplated modes of carrying out the invention. The detailed description is not to be taken in a limiting sense, but the detailed description is made merely for the purpose of illustrating the general principles of the invention, since the scope of the invention is best defined by the appended claims.

Figure 1:
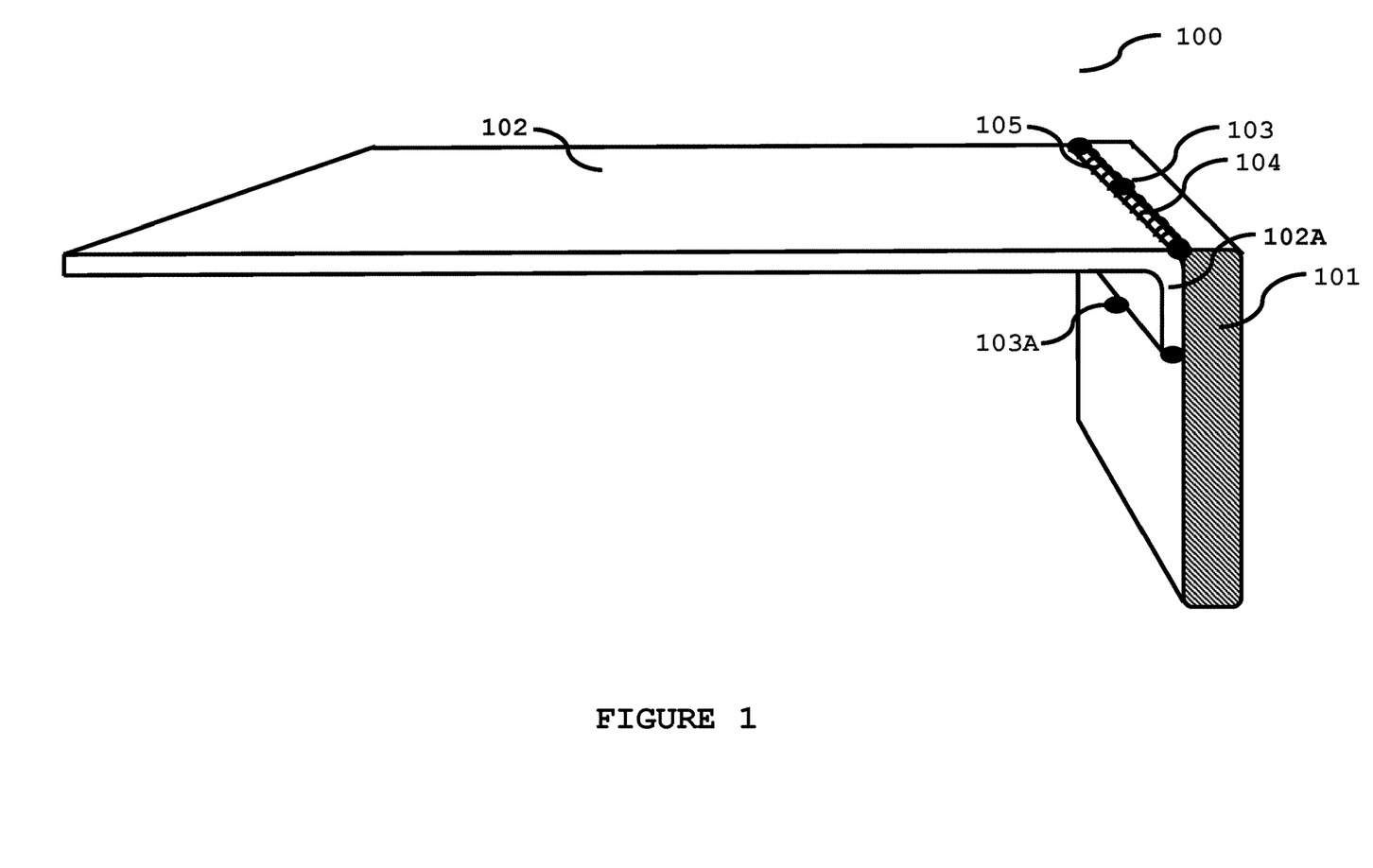
FIG. 1 is a schematic perspective view illustrating practice of an illustrative embodiment of the invention wherein the thin sheet metal panel is bent along the edge forming a hem line with substantial length to help distributing the heat away from the weld joint; the bent sheet metal panel is disposed edgewise at the hem line along the longitudinal edge of a load bearing metal plate. A uniform weld line is applied at the joint line. Excess materials above the surface of the sheet metal panel are removed to form a body structure having a smooth exterior surface and an interior surface concealing the hem line adjacent to the load bearing metal plate.

FIG. 1 illustrates one embodiment of a vehicle body structure 100 comprising of a thin sheet metal panel 102 wherein the thin sheet metal panel is preformed by bending along the edge forming a hem line 102A with substantial length to help distributing the heat away from the weld line 104 on the thin sheet metal panel while allowing the heat source to melt the substantially thick load bearing metal plate 101 forming a joining molten metal puddle during the welding process; the preformed sheet metal panel 102 is disposed edgewise at the hem line 102A along the edge of a thick load bearing metal plate 101. A plurality of tack welds 103 and 103A are placed along the intended weld line 104 and the end of the sheet metal panel hem line 102A, respectively, to hold the thin sheet metal panel 102 and the thick load bearing metal plate 101 together. A uniform weld line 104 is applied at the joint line between the thin sheet metal panel 102 and the thick load bearing metal plate 101. Excess materials 105 above the surface of the sheet metal panel 102 and the thick load bearing metal plate 101 are removed to form a vehicle body structure having a smooth exterior surface on one side ending with the load bearing metal plate as an edge trim and an interior surface on the other side concealing the hem line from the outside view of the vehicle body structure.

Figure 2:
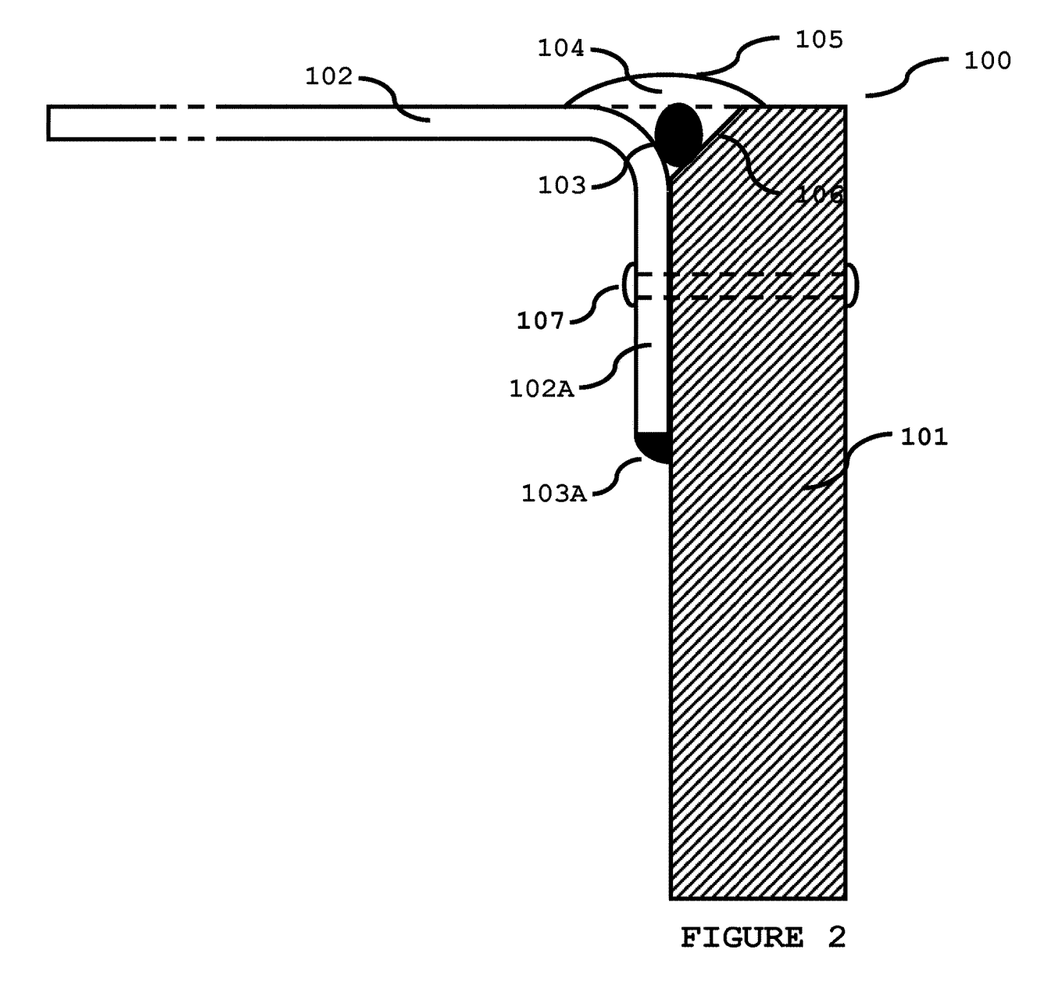
FIG. 2 is a cross-sectional view of the illustrating practice of an illustrative embodiment of the invention wherein the edge of the load bearing metal plate where the weld line will be applied is beveled for the welding puddle to stay concentrated within the weld line. A plurality of tack welds are placed onto the weld line and at the end of the hem line at substantial spacing to hold the sheet metal panel and the load bearing metal plate together for welding. For added holding strength, the sheet metal panel hem line and the thick metal plate are held together using a plurality of suitable rivets or components with similar holding properties (e.g. screws, pins, etc.)
Figure 3:
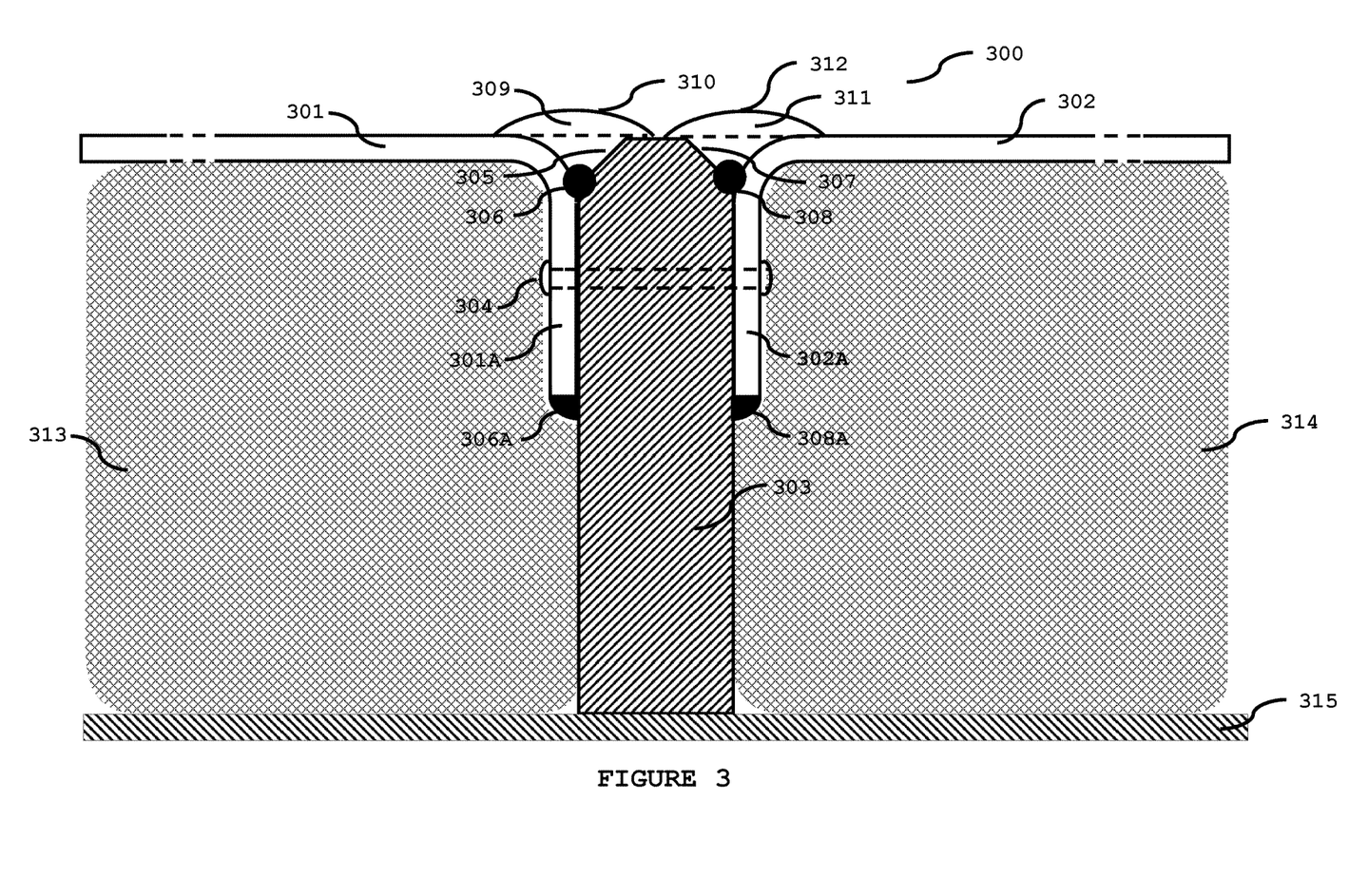
FIG. 3 is a cross-sectional view of the illustrating practice of an illustrative embodiment of the invention wherein a sandwich body structure is constructed by having two sheet metal panels welded substantially perpendicular to the longitudinal edges of a load bearing structure component one on each side of the load bearing structure component forming a vehicle body structure having a continuous exterior surface area with the load bearing structure component in the middle of the surface acting as both a load bearing member and a stiffener to the vehicle body structure. Furthermore, a sandwich structure is constructed by bonding or inserting a core or a plurality of cores in between the structure interior surface and an interior panel to provide the desired insulation and stiffness properties.
Figure 4:
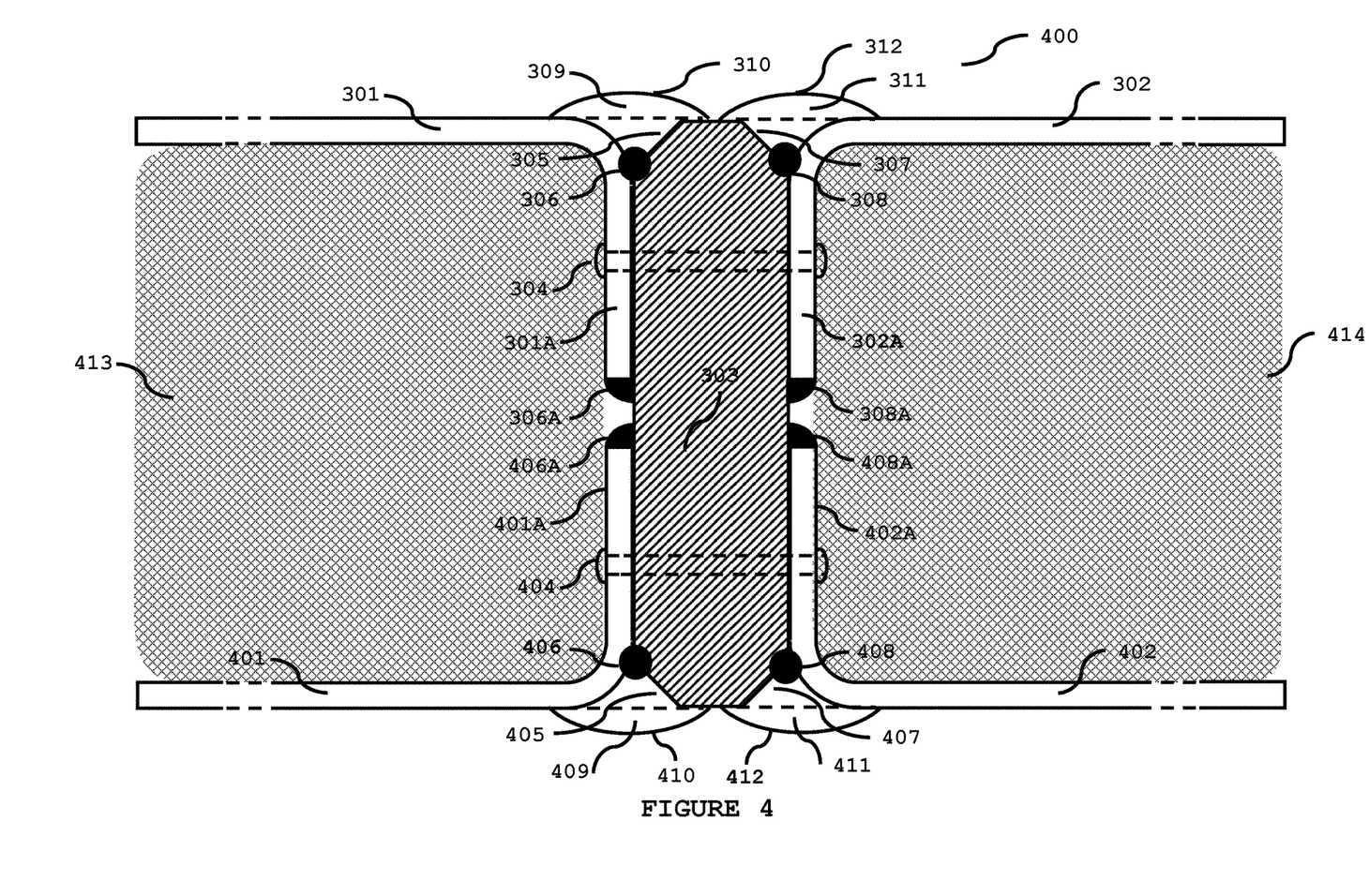
FIG. 4 is a cross-sectional view of the illustrating practice of an illustrative embodiment of the invention wherein four sheet metal panels are welded substantially perpendicular to the longitudinal edges one on each side of the load bearing structure component forming a double sided sandwich vehicle body structure comprising of two continuous smooth exterior surfaces and two facing interior surfaces having a load bearing structure component in the middle of the interior surfaces acting as both a load bearing member and a stiffener to the vehicle body structure. Furthermore, a core or a plurality of cores are bonded or inserted in between the interior structure surfaces to provide the desired insulation and stiffness properties.
Figure 5:
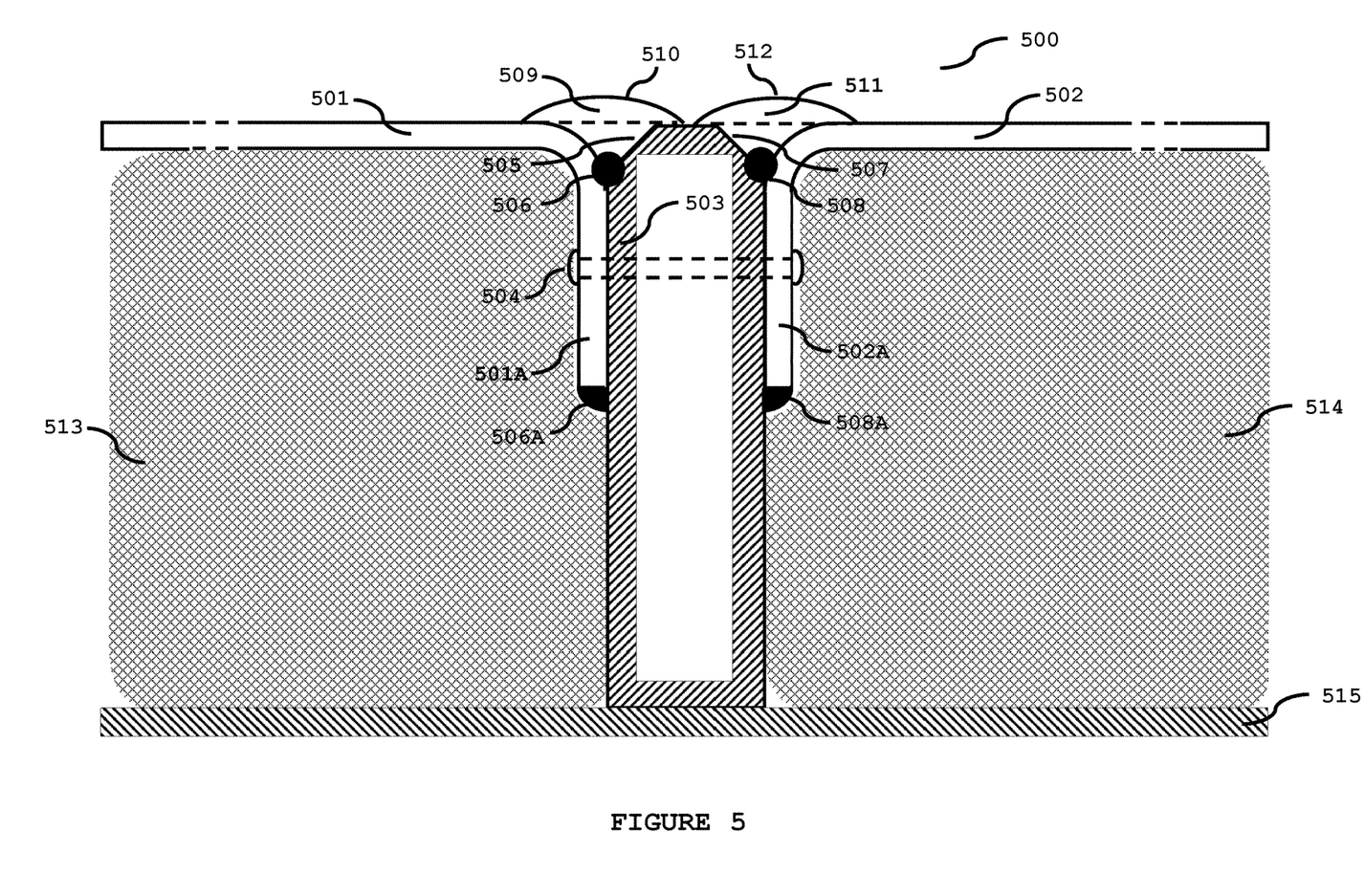
FIG. 5 is a cross-sectional view of the illustrating practice of an illustrative embodiment of the invention wherein two sheet metal panels are welded substantially perpendicular to the longitudinal edges one on each side of the load bearing metal tube component forming a vehicle body structure comprising a continuous and smooth exterior surface and an interior surface having a load bearing metal tube component in the middle of the surface acting as both a load bearing member and a stiffener to the vehicle body structure. Furthermore, a sandwich vehicle body structure is constructed by bonding or inserting a core or a plurality of cores in between the structure interior surface and an interior panel to provide the desired insulation and stiffness properties.
Figure 6:
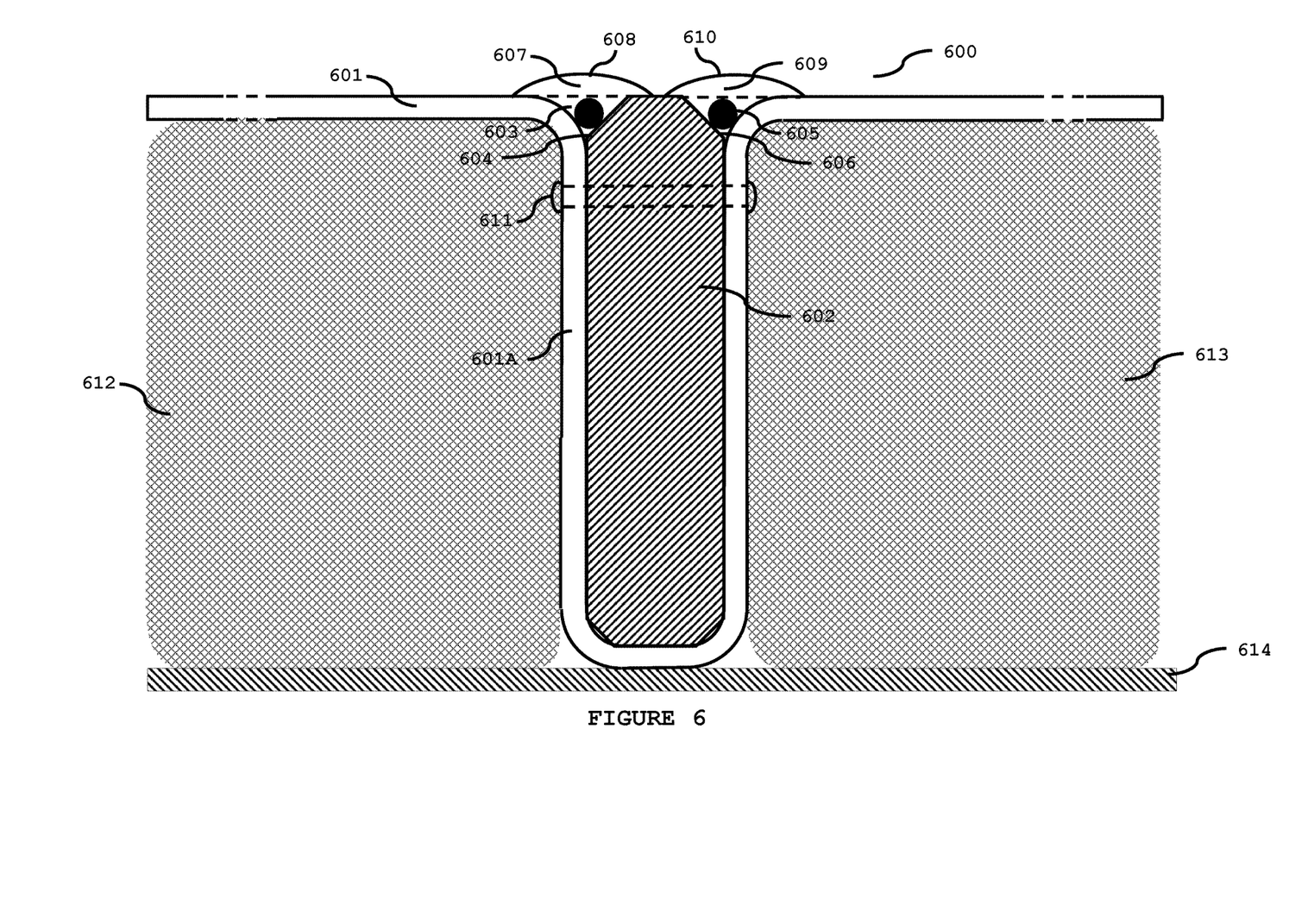
Figure 7:
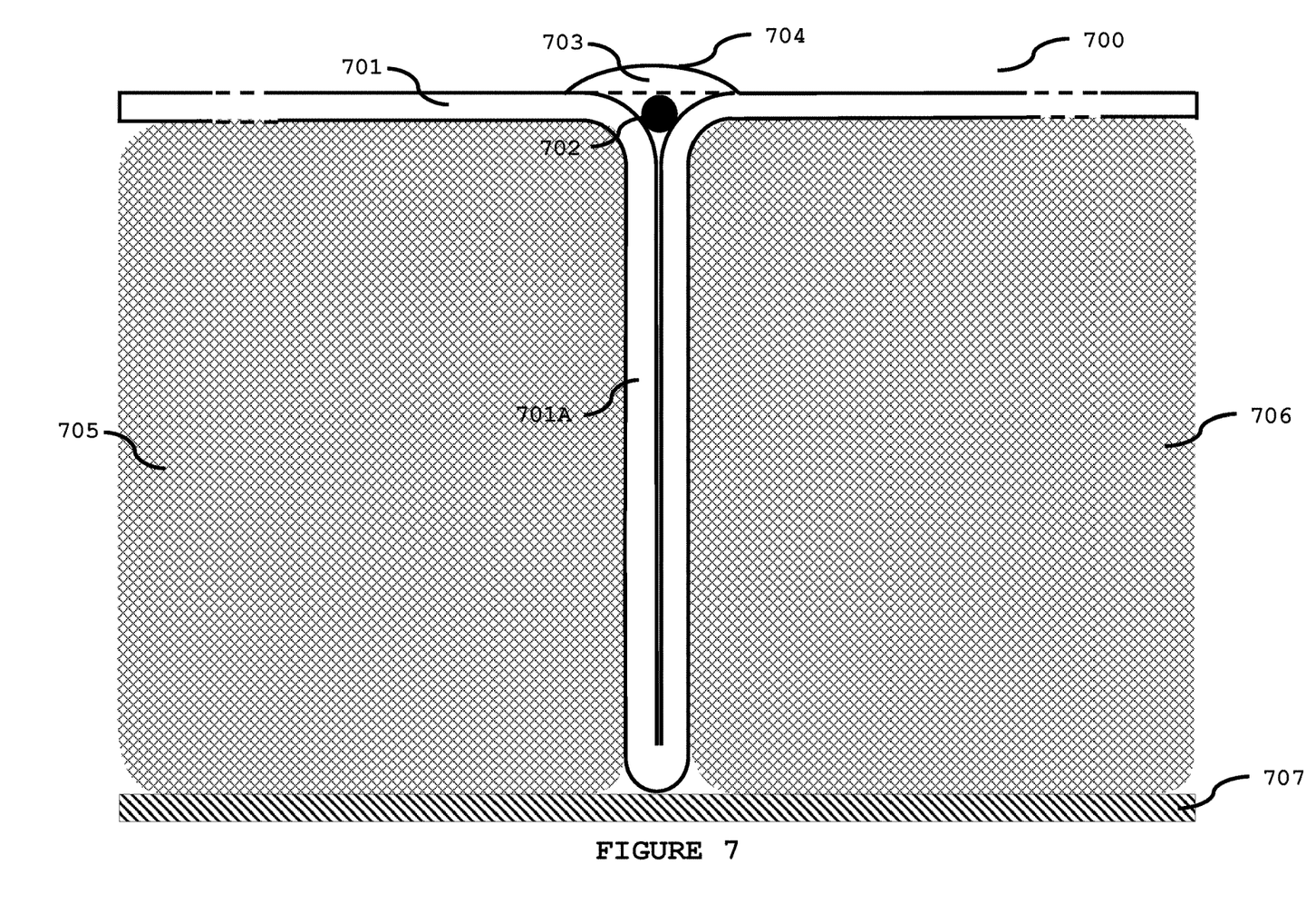
FIG. 7 is a cross-sectional view of the illustrating practice of an illustrative embodiment of the invention wherein a sheet metal panel is preformed with a U-shape with a closing gap at the knees of the U-shape channel. The bent knees of the U-shape channel are welded using a flare-V weld joint forming a vehicle body structure comprising a smooth and continuous exterior surface and an interior surface having a sheet metal panel fold component in the middle of the surface acting as a stiffener to the vehicle body structure. Furthermore, a sandwich structure is constructed by bonding or inserting a core or a plurality of cores in between the structure interior surface and an interior panel to provide the desired insulation and stiffness properties.
Figure 8:
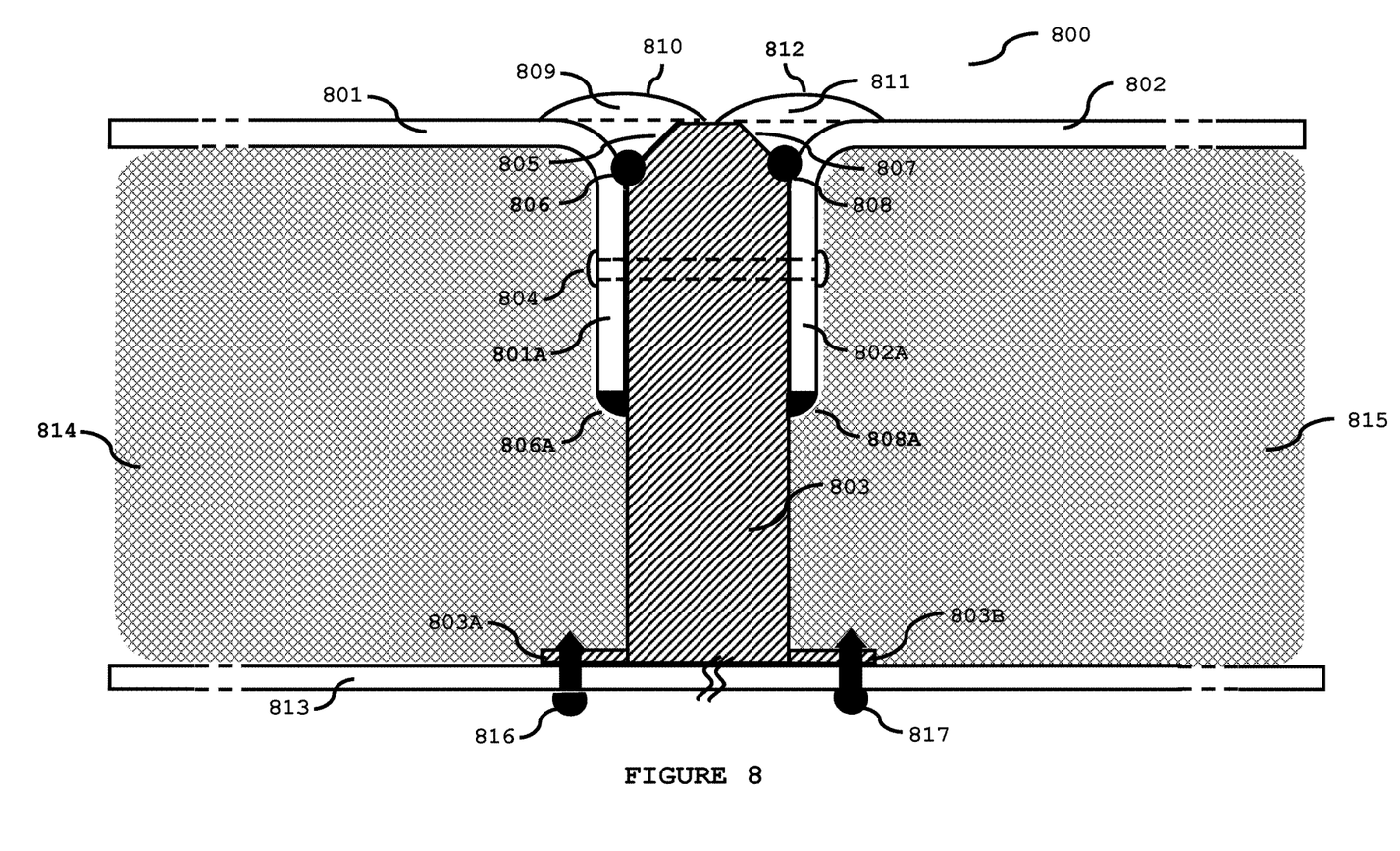
Figure 9:
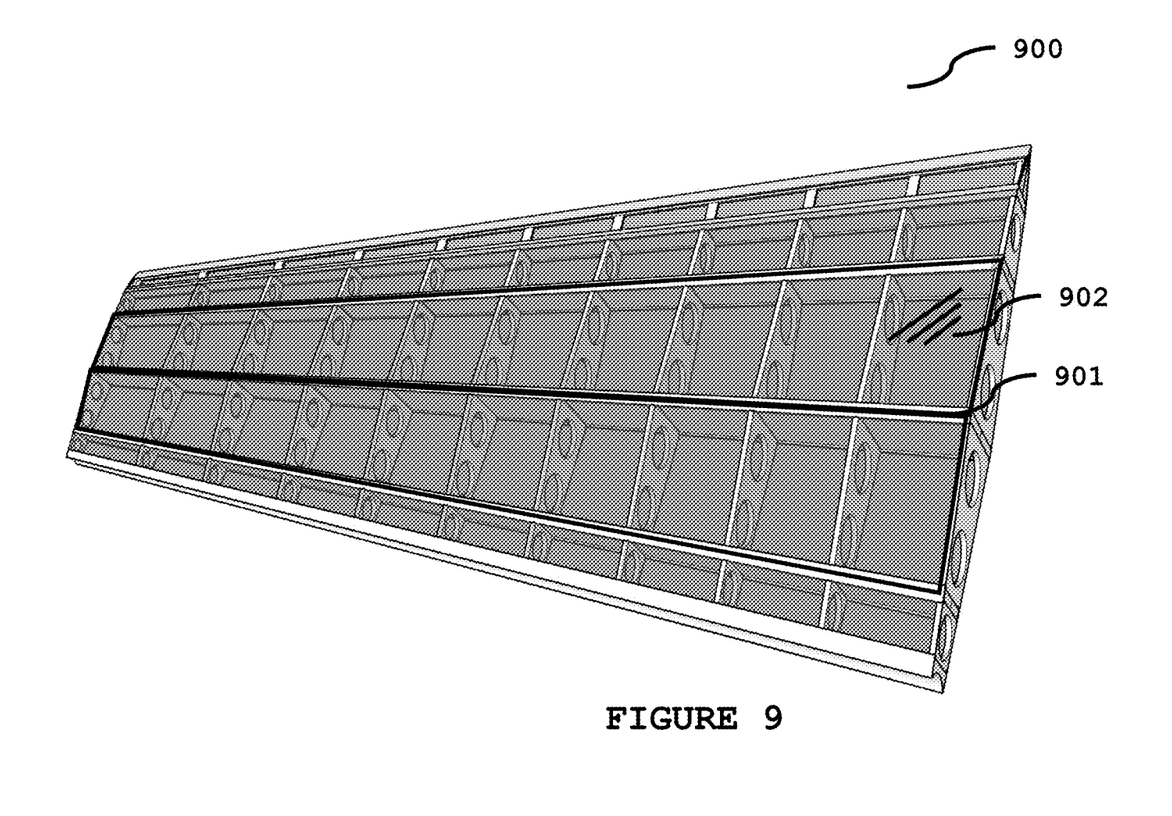
FIG. 9 is a schematic perspective view illustrating practice of an illustrative embodiment of the invention wherein a vehicle body structure is constructed by welding a plurality of sheet metal panels to a plurality of load bearing metal plates forming a non-planar surface body such as a cone or a tube shape body suitable for aerospace vehicles.

With reference to FIG. 2, not to be taken in a limiting sense, a details of a cross-sectional view of the illustrating practice of an illustrative embodiment of the vehicle body structure 100 wherein the edge 106 of the thick load bearing metal plate 101 where the weld line 104 will be applied is beveled for the welding puddle to stay concentrated within the weld line 104. For added holding strength between the sheet metal panel 102 and the substantially thick load bearing metal plate 101, the sheet metal panel hem line 102A and the thick load bearing metal plate 101 are held to together using a plurality of suitable rivets 107 or components with similar holding properties (e.g. screws, pins, etc.) having substantial spacing depending on the desired holding strength. The rivets 107 will not be visible from the outside of the exterior surface;

We now refer to FIG. 3, not to be taken in a limiting sense, a details of a cross-sectional view of an illustrative embodiment of the invention wherein two preformed sheet metal panel panels 301 and 302 having a hem lines 301A and 302A, respectively, are disposed along the longitudinal edge of the thick load bearing metal plate 303. The edges 305 and 307 of the load bearing metal plate 303 where the weld lines 309 and 311 will be applied are beveled for the welding puddle to stay concentrated within the weld lines 309 and 311. A plurality of tack welds 306 and 308 are placed along the intended weld line 309 and 311, respectively. Additionally, a plurality of tack welds 306A and 308A are placed along the end of hem lines 301A and 302A, respectively, to hold the thin sheet metal panels panels 301 and 302 and the thick load bearing metal plate 303 together. For added holding strength, the sheet metal panel hem lines 301A, 302A and the load bearing metal plate 303 are held together using a plurality of suitable rivets 304 or components with similar holding properties (e.g. screws, pins, etc.) having substantial spacing depending on the desired holding strength. The rivets 304 will not be visible from the outside of the exterior surface. A plurality of uniform weld lines 309 and 311 are applied to form a vehicle body structure having a continuous exterior surface and an interior surface with the load bearing structure component in the middle of the surface acting as both a load bearing member and a stiffener to the vehicle body structure. The hem lines 301A and 302A are concealed by the exterior surface and not visible from the outside view of the vehicle body structure. Excess materials 310 and 312 above the surface of the sheet metal panels 301 and 302 and the thick load bearing metal plate 303 are removed to form a vehicle body structure having a smooth exterior surface. Furthermore, a vehicle sidewall structure 300 is constructed by bonding cores 313 and 314 and an interior wall panel 315 to the interior surface of the vehicle body structure to provide the desired insulation, stiffness, and decorative properties;

Referring to FIG. 4, not to be taken in a limiting sense, a details of a cross-sectional view of of an illustrative embodiment of the invention wherein two pairs of preformed thin sheet metal panels 301, 302 and 401, 402 having hem lines 301A, 302A and 401A and 402A, respectively, are disposed along the longitudinal edges at both ends of the substantially thick load bearing metal plate 303. The edges 305, 307 and 405, 407 of the load bearing metal plate 303 are beveled for the welding puddle to stay concentrated within the weld lines 309, 311 and 409, 411. A plurality of tack welds 306, 308 and 406, 408 are placed along the intended weld lines 309, 311 and 409, 411, respectively. Additionally, a plurality of tack welds 306A, 308A and 406A, 408A are placed along the end of hem lines 301A, 302A and 401A, 402A, respectively, to hold together the thin sheet metal panels 301, 302 and 401, 402 to the thick metal plate 303. For added holding strength, the sheet metal panel hem lines 301A, 302A, 401A, 402A and the load bearing metal plate 303 are held to together using a plurality of suitable rivets 304 and 404 or components with similar holding properties (e.g. screws, pins, etc.) having substantial spacing depending on the desired holding strength. The rivets 304 and 404 will not be visible from the outside view of the exterior surfaces. A plurality of uniform weld lines 309, 311 and 409, 411 are applied to form a double sided sandwich vehicle body structure comprising two continuous exterior surface areas and two facing interior surfaces having the load bearing metal plate in the middle of the interior surfaces acting as both a load bearing member and a stiffener to the vehicle body structure. Moreover, the interior surfaces are adhesively bonded with cores 413 and 414 one on each side of the load bearing plate 303. Excess materials 310, 312 and 410, 412 above the surface of the sheet metal panels 301, 302, 401, 402, and the thick metal plate 303 are removed to form a dual sided sandwich vehicular structure 400 having smooth exterior surfaces;

Now refer to FIG. 5, not to be taken in a limiting sense, a details of a cross-sectional view of of an illustrative embodiment of the invention wherein two sheet metal panels 501 and 502 are preformed to have hem lines 501A and 502A, respective. The sheet metal panels 501 and 502 are disposed longitudinally along the edges of the load bearing metal tube 503. The edges 505 and 507 of the load bearing metal tube where the weld line will be applied is beveled for the welding puddle to stay concentrated within the weld lines 509 and 511. A plurality of tack welds 506 and 508 are placed along the intended weld line 509 and 511, respectively. Additionally, a plurality of tack welds 506A and 508A are placed along the end of the hem lines 501A and 502A, respectively, to hold the thin sheet metal panels 501 and 502 and the thick metal plate 503 together. For added holding strength, the sheet metal panel hem lines 501A, 502A and the load bearing metal tube 503 are held to together using a plurality of suitable rivets 504 or components with similar holding properties (e.g. screws, pins, etc.) having substantial spacing depending on the desired holding strength. The rivets 504 will not be visible from the outside of the exterior surfaces. A plurality of uniform weld lines 509 and 511 are applied to form a vehicle body structure having a continuous exterior surface and an interior surface with the load bearing metal tube in the middle of the interior surface acting as both a load bearing member and a stiffener to the vehicle body structure. Excess materials 510 and 512 above the surface of the sheet metal panels 501 and 502 and the load bearing metal tube 503 are removed to form a structure having a smooth exterior surface. Furthermore, a sandwich structure 500 is constructed by bonding cores 513, 514 and an interior panel 515 to the interior surface of the vehicle body structure to provide the desired insulation, stiffness, and decorative properties;

Referring to FIG. 6, not to be taken in a limiting sense, a details of a cross-sectional view of of an illustrative embodiment of the invention wherein a sheet metal panel 601 is preformed with a U-shape channel 601A having a substantially thick load bearing plate 602 embedded in the U-shape channel 601A. The edges 604 and 606 of the load bearing metal plate where the weld lines will be applied are beveled for the welding puddle to stay concentrated within the weld lines 607 and 609. A plurality of tack welds 603 and 605 are placed along the intended weld line 607 and 609, respectively. For added holding strength, the sheet metal panel U-shape channel 601A and the load bearing metal plate 603 are held to together using a plurality of suitable rivets 611 or components with similar holding properties (e.g. screws, pins, etc.) having substantial spacing depending on the desired holding strength. The rivets 611 will not be visible from the outside of the exterior surfaces. The exposed edges 604 and 606 of the load bearing metal plate 602 are welded longitudinally on each side of the load bearing metal plate 602 to the bent knees of the U-shape channel 601A forming a vehicle body structure comprising of an continuous exterior surface and an interior surface having a load bearing metal plate component in the middle of the surface acting as both a load bearing member and a stiffener to the vehicle body structure. Excess materials 608 and 610 above the surface of the sheet metal panels 601 and the load bearing plate 602 are removed to form a body structure having a smooth exterior surface. Furthermore, a sandwich structure 600 is constructed by bonding cores 612 and 613 and an interior panel 614 to the interior surface of the body structure provide the desired insulation, stiffness, and decorative properties;

Referring to FIG. 7, not to be taken in a limiting sense, a details of a cross-sectional view of of an illustrative embodiment of the invention wherein a sheet metal panel 701 is preformed with a U-shape 701A with a closing gap at the knees of the U-shape channel 701A. A plurality of tack welds 702 are placed along the intended weld line 703. The bent knees of the U-shape channel 701A are welded using a uniform flare-V weld joint forming a vehicle body structure comprising a continuous exterior surface and an interior surface having a sheet metal panel fold component in the middle of the surface acting as a stiffener to the vehicle body structure. Excess materials 704 above the surface of the sheet metal panel 701 are removed to form a vehicle body structure having a smooth exterior surface. Furthermore, a sandwich structure 700 is constructed by bonding cores 705, 706 and an interior panel 707 on to the interior surface of the vehicle body structure to provide the insulation, stiffness, and decorative properties;

Referring to FIG. 8, not to be taken in a limiting sense, a details of a cross-sectional view of of an illustrative embodiment of the invention wherein two preformed sheet metal panels 801 and 802 each having a hem line 801A and 802A, respectively, are disposed along the edges of the load bearing metal plate 803 having flanges 803A and 803B. The edges 805 and 807 of the load bearing metal plate 803 where the weld lines 809 and 811 will be applied are beveled for the welding puddle to stay concentrated within the weld lines 809 and 811. A plurality of tack welds 806 and 808 are placed along the intended weld line 809 and 811, respectively. Additionally, a plurality of tack welds 806A and 808A are placed along the end of the hem lines 801A and 802A, respectively, to hold the thin sheet metal panels 801 and 802 and the load bearing metal plate 803 together. For added holding strength, the sheet metal panel hem lines 801A, 802A and the load bearing metal plate 803 are held to together using a plurality of suitable rivets 804 or components with similar holding properties (e.g. screws, pins, etc.) having substantial spacing depending on the desired holding strength. The rivets 804 will not be visible from the outside of the exterior surface. A plurality of uniform weld lines 809 and 811 are applied to form a vehicle body structure having a continuous exterior surface and an interior surface with the load bearing metal plate in the middle of the surface acting as both a load bearing member and a stiffener to the vehicle body structure. Excess materials 810 and 812 above the surface of the sheet metal panels 801 and 802 and the load bearing metal plate 803 are removed to form a vehicle body structure having a smooth exterior surface. Furthermore, a vehicle sidewall structure is constructed by bonding or placing insulation materials 814 and 815 behind the exterior surface area then mounting a interior wall panel 813 to the flanges 803A and 803B of the load bearing metal plate 803 using suitable rivets 816 and 817 or components with similar holding properties (e.g. screws, pins, etc.) to provide the insulation, stiffness, and interior decorative properties;

We now referring to FIG. 9, not to be taken in a limiting sense, FIG. 9 is a schematic perspective view illustrating practice of an illustrative embodiment of the invention wherein a vehicle body structure 900 is constructed by welding a plurality of preformed sheet metal panels 901 having hem lines to allow welding thin sheet metal panels to a plurality of substantially thicker load bearing structure members 902 forming a non-planar surface body such as a cone or a tube shape body suitable for aerospace vehicles. It will be appreciated that the arrangements of vehicular sidewalls as described in FIG. 1 through 8 can be used in a vehicle body structure 900 illustrated herein. Additionally, will be appreciated that the arrangements of vehicular sidewalls as described in FIG. 1 through 8 can be used in the construction of the vehicle modular wall, floor, or roof units each having a plurality of interconnecting joints. Those who are skilled in the art can easily design such interconnecting joining panels using available designs such as snap-fit joints, latitudinal joints, profile joints, screw ports joints, etc. Moreover, the vehicle body structure 900 as illustrated herein is simply illustrative of one of a number of possible arrangements and that a number of variations of these arrangements can be made without departing from the spirit of the present invention.

Although the present invention has been described with reference to specific embodiments, these embodiments are illustrative only and not limiting. Many other applications and embodiments of the present invention will be apparent in light of this disclosure and the following claims.

The invention claimed is:

1. A process of joining body panels of vehicle bodies by welding a metal sheet to an edge of a load bearing structural component to form a vehicle body article having an exterior surface of the metal sheet flush with the edge of the structural component, the process comprising:

pre-forming the metal sheet by bending the metal sheet to form a hem line substantially perpendicular with the exterior surface of the metal sheet and a bent knee at the bending of the hemline to define a metal sheet edge;

wherein the hem line is configured to be substantial in length to help dissipate heat created during the welding operation substantially uniformly in all directions;

providing the structural component with a side edge surface area substantially matching the hem line of the metal sheet;

disposing the pre-formed metal sheet edgewise at the hem line along the longitudinal edge of the structural component forming a joint line between the bent knee of the hem line and the adjacent longitudinal edge of the structural component for welding while holding the exterior surface of the metal sheet substantially in alignment with the edge of the structural component;

beveling the longitudinal edge of the structural component adjacent to the metal sheet hem-line for welding;

placing a plurality of tack welds along the joint line to hold the metal sheet and the structural component together;

applying a substantially uniform weld along the joint line to join the metal sheet and the structural component together; and removing the excess materials above the surface of the metal sheet and the edge of the structural component to form a vehicle body structure having a smooth exterior surface and an interior surface with the structural component acting as the load bearing structural component acting as the load bearing structural component of the vehicle body structure and edge trim while concealing the hem line adjacent to the structural component from an outside view of the vehicle body structure.

2. A process of forming vehicle body articles of claim 1, wherein the substantially uniform weld line is formed by laser welding or electric arc welding methods or a combination thereof.

3. A process of forming body articles of vehicle bodies by welding a metal sheet between two structural components to form a vehicle body article having an exterior surface of the metal sheet flush with the edges of the structural components, the process comprising:

pre-forming the metal sheet by bending the metal sheet at each of the edges of the metal sheet adjacent to the structural component; wherein the bending forms a hemline substantially perpendicular with the exterior surface of the metal sheet and a bent knee at the bending of the hemline to define metal sheet edges;

disposing the metal sheet edgewise in between the two structural components having the bending knees of the hem lines substantially in alignment and flush with edges of the two structural components forming joint lines for welding;

beveling the longitudinal edges of the structural components adjacent to the metal sheet hem-lines for welding;

placing a plurality of tack welds along each of the joint lines to hold the metal sheet and the structural components together;

applying a substantially uniform weld along each joint line to join the metal sheet and the structural components together; and removing the excess materials above the surface of the metal sheet and the edge of the structural components to form a vehicle body structure having a smooth exterior surface and interior surface with structural components on two opposing sides, acting as the load bearing structural components and edge trims while concealing the hem lines adjacent to the structural components from an outside view of the vehicle body structure.

4. A process of forming vehicle body articles of claim 3, further comprising:

bending remaining available edges of the metal sheet not yet welded to form a hem line on each of the available edges adjacent to adjacent structural components; and welding the available edges to the adjacent structural components to form a vehicle body structure having a smooth exterior surface and an interior surface with a plurality of the structural components acting as the load bearing structural components and edge trims while concealing the hem lines adjacent to the structural components from the outside view of the vehicle body structure.

5. A process of forming vehicle body articles of claim 4, wherein a vehicle body structure is constructed by further welding a plurality of the vehicle body structures and metal sheets of claim 3 together, metal sheet edges to structural components, wherein the metal sheets are disposed one on each side of a shared common structural component, forming a non-planar surface vehicle body having a shape of a box, a cone, a tube, or a container suitably as vehicle body articles.

6. A process of forming vehicle body articles of claim 3, wherein a modular interconnecting vehicle body panel is constructed by having at least two opposing structural components edge trims fitted with a plurality of interconnecting joints on the side of the structural component not welded to the metal sheet as a means for connecting a plurality of the modular interconnecting body panels together forming the vehicle body articles suitably as a wall or a roof.

* * * * *